US009469377B2

(12) United States Patent
Kuroda

(10) Patent No.: US 9,469,377 B2
(45) Date of Patent: Oct. 18, 2016

(54) BICYCLE GEAR CHANGING APPARATUS

(71) Applicant: Shimano Inc., Sakai, Osaka (JP)

(72) Inventor: Mao Kuroda, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/822,204

(22) Filed: Aug. 10, 2015

(65) Prior Publication Data

US 2015/0344103 A1    Dec. 3, 2015

Related U.S. Application Data

(62) Division of application No. 13/850,550, filed on Mar. 26, 2013.

(51) Int. Cl.
*B62M 9/122* (2010.01)
*F16H 59/04* (2006.01)
*F16H 61/02* (2006.01)
*B62M 25/04* (2006.01)
*B62M 25/08* (2006.01)
*B62K 23/06* (2006.01)
*B62M 25/00* (2006.01)

(52) U.S. Cl.
CPC .............. *B62M 9/122* (2013.01); *B62K 23/06* (2013.01); *B62M 25/04* (2013.01); *B62M 25/08* (2013.01); *F16H 59/044* (2013.01); *F16H 61/0213* (2013.01); *B62M 25/00* (2013.01); *F16H 2061/0227* (2013.01); *Y10T 74/2003* (2015.01)

(58) Field of Classification Search
CPC .. B62M 25/00; B62M 25/08; B62M 25/045; B62M 2025/003; F16H 61/0204; F16H 61/0213; F16H 2061/0216; F16H 2061/0223
See application file for complete search history.

(56) References Cited

U.S. PATENT DOCUMENTS

| | | | |
|---|---|---|---|
| 5,356,348 A | 10/1994 | Bellio et al. | |
| 5,480,356 A | 1/1996 | Campagnolo | |
| 5,577,969 A | 11/1996 | Watarai | |
| 5,653,649 A | 8/1997 | Watarai | |
| 5,865,454 A | 2/1999 | Campagnolo | |
| 5,970,816 A | 10/1999 | Savard | |
| 6,682,087 B1 * | 1/2004 | Takeda | B62J 99/00 280/238 |
| 7,306,531 B2 | 12/2007 | Ichida et al. | |
| 7,630,810 B2 | 12/2009 | Guderzo | |
| 7,854,180 B2 | 12/2010 | Tetsuka | |
| 8,137,223 B2 | 3/2012 | Watarai et al. | |
| 8,241,158 B2 | 8/2012 | Ishikawa | |
| 8,272,292 B2 | 9/2012 | De Perini | |
| 8,712,656 B2 | 4/2014 | Lee | |
| 2008/0108465 A1 * | 5/2008 | Ichida | B62M 25/08 474/70 |
| 2010/0244401 A1 | 9/2010 | Hara et al. | |
| 2012/0245809 A1 | 9/2012 | Ichida | |
| 2014/0070930 A1 | 3/2014 | Hara | |

FOREIGN PATENT DOCUMENTS

EP     0 727 348 B1     10/2003

* cited by examiner

*Primary Examiner* — Kevin Hurley
(74) *Attorney, Agent, or Firm* — Global IP Counselors

(57) ABSTRACT

A bicycle gear changing apparatus is basically provided with a controller that includes memory with a plurality of pre-stored shift tables. The controller is configured to control a shifting operation of at least one of a first gear changing device and a second gear changing device based on a selected one of the pre-stored shift tables.

8 Claims, 5 Drawing Sheets

|  | | FC | | |
|---|---|---|---|---|
|  | | 24 | 32 | 42 |
|  | | Low | Mid | Top |
| CS | 36  1st | 0.67 | 0.89 | 1.17 |
|  | 32  2nd | 0.75 | 1.00 | 1.31 |
|  | 28  3rd | 0.86 | 1.14 | 1.50 |
|  | 24  4th | 1.00 | 1.33 | 1.75 |
|  | 21  5th | 1.14 | 1.52 | 2.00 |
|  | 19  6th | 1.26 | 1.68 | 2.21 |
|  | 17  7th | 1.41 | 1.88 | 2.47 |
|  | 15  8th | 1.60 | 2.13 | 2.80 |
|  | 13  9th | 1.85 | 2.46 | 3.23 |
|  | 11  10th | 2.18 | 2.91 | 3.82 |

FIG. 4

| | | | FC | | |
|---|---|---|---|---|---|
| | | | 24 | 32 | 42 |
| | | | Low | Mid | Top |
| CS | 36 | 1st | 0.67 | 0.89 | 1.17 |
| | 32 | 2nd | 0.75 | 1.00 | 1.31 |
| | 28 | 3rd | 0.86 | 1.14 | 1.50 |
| | 24 | 4th | 1.00 | 1.33 | 1.75 |
| | 21 | 5th | 1.14 | 1.52 | 2.00 |
| | 19 | 6th | 1.28 | 1.68 | 2.21 |
| | 17 | 7th | 1.41 | 1.88 | 2.47 |
| | 15 | 8th | 1.60 | 2.13 | 2.80 |
| | 13 | 9th | 1.85 | 2.46 | 3.23 |
| | 11 | 10th | 2.18 | 2.91 | 3.82 |

FIG. 5

| | | | FC | |
|---|---|---|---|---|
| | | | 24 | 38 |
| | | | Low | Top |
| CS | 36 | 1st | 0.67 | 1.06 |
| | 32 | 2nd | 0.75 | 1.19 |
| | 28 | 3rd | 0.86 | 1.36 |
| | 24 | 4th | 1.00 | 1.58 |
| | 21 | 5th | 1.14 | 1.81 |
| | 19 | 6th | 1.26 | 2.00 |
| | 17 | 7th | 1.41 | 2.24 |
| | 15 | 8th | 1.60 | 2.53 |
| | 13 | 9th | 1.85 | 2.92 |
| | 11 | 10th | 2.18 | 3.45 |

FIG. 6

BICYCLE GEAR CHANGING APPARATUS

CROSS-REFERENCE TO RELATED APPLICATIONS

This application is a divisional application of U.S. patent application Ser. No. 13/850,550 filed on Mar. 26, 2013. The entire disclosure of U.S. patent application Ser. No. 13/850,550 is hereby incorporated herein by reference.

BACKGROUND

1. Field of the Invention

This invention generally relates to a bicycle gear changing apparatus. More specifically, the present invention relates to a bicycle gear changing apparatus that controls at least one of a first gear changing device and a second gear changing device with a prescribed shift route.

2. Background Information

Currently, most bicycle transmissions are manually operated by a shift operating wire connected between a manual transmission and a manually operated shift operating device mounted on the handlebar. The rider operates the shift operating device to selectively pull or release the shift operating wire which, in turn, operates a derailleur of the transmission in the desired manner. More recently, bicycles have been provided with an electric drive train for smoother and easier shifting. Electric drive trains may be operated manually or automatically. In manually operated electric drive trains, usually, a button or lever on a shift control device mounted to the bicycle handlebar is manipulated so that a gear shift command is output to operate the motor for upshifting or downshifting the bicycle transmission accordingly. In automatically operated electric drive trains, the gear shift commands are generated automatically based on various running conditions of the bicycle.

SUMMARY

Generally, the present disclosure is directed to various features of a bicycle gear changing apparatus that controls at least one of a first gear changing device and a second gear changing device with a prescribed shift route.

In view of the state of the known technology and in accordance with one aspect of the present invention, a bicycle gear changing apparatus is provided that basically comprises a controller that includes memory with a plurality of pre-stored shift tables. The controller is configured to control a shifting operation of at least one of a first gear changing device and a second gear changing device based on a selected one of the pre-stored shift tables.

In accordance with a second aspect of the present invention, the bicycle gear changing apparatus according to the first aspect further comprises a cycle computer operatively coupled to the controller to select with which one of the pre-stored shift tables is used in controlling the first and second gear changing devices.

In accordance with a third aspect of the present invention, the bicycle gear changing apparatus according to the second aspect is configured so that the cycling computer includes an input port configured to be attached to a computer to select the pre-stored shift tables.

In accordance with a fourth aspect of the present invention, the bicycle gear changing apparatus according to the first aspect further comprises a first shift operating device and a second shift operating device. The controller is configured to control the shifting operation of the first gear changing device upon receiving a shift signal generated by the first shift operating device. The controller is configured to control the shifting operation of the second gear changing device upon receiving a shift signal generated by the second shift operating device.

In accordance with a fifth aspect of the present invention, the bicycle gear changing apparatus according to the fourth aspect is configured so that the pre-stored shift tables comprise a first prescribed shift route and a second prescribed shift route. The controller is configured to actuate the first gear changing device in accordance with the first prescribed shift route upon receiving the shift signal generated by the first shift operating device. The controller is configured to actuate the second gear changing device in accordance with the second prescribed shift route upon receiving a shift signal generated by the second shift operating device.

In accordance with a sixth aspect of the present invention, the bicycle gear changing apparatus according to the fifth aspect is configured so that the first prescribed shift route includes at least one synchro-shift point, and the second prescribed shift route includes at least one synchro-shift point.

In accordance with a seventh aspect of the present invention, the bicycle gear changing apparatus according to the sixth aspect is configured so that the controller is configured to operate both the first gear changing device and the second gear changing device at the synchro-shift point in response to receiving the first shift signal.

In accordance with an eighth aspect of the present invention, the bicycle gear changing apparatus according to the fifth aspect is configured so that the pre-stored shift table comprises further a third prescribed shift route and a fourth prescribed shift route.

In accordance with a ninth aspect of the present invention, the bicycle gear changing apparatus according to the eighth aspect is configured so that the first shift operating device comprises a first electrical switch and a second electrical switch, and the second shift operating device comprises a third electrical switch and a fourth electrical switch.

In accordance with a tenth aspect of the present invention, the bicycle gear changing apparatus according to the ninth aspect is configured so that the controller is configured to operate the first gear changing device and the second gear changing device in accordance with the first prescribed shift route in response to receiving shift signals from the first electrical switch. The controller is configured to operate the first gear changing device and the second gear changing device in accordance with the second prescribed shift route in response to receiving shift signals from the third electrical switch. The controller is configured to operate the first gear changing device and the second gear changing device in accordance with the third prescribed shift route in response to receiving shift signals from the second electrical switch. The controller is configured to operate the first gear changing device and the second gear changing device in accordance with the fourth prescribed shift route in response to receiving shift signals from the fourth electrical switch.

Other objects, features, aspects and advantages of the disclosed bicycle gear changing apparatus will become apparent to those skilled in the bicycle field from the following detailed description, which, taken in conjunction with the annexed drawings, discloses preferred embodiments of the bicycle gear changing apparatus.

BRIEF DESCRIPTION OF THE DRAWINGS

Referring now to the attached drawings which form a part of this original disclosure:

FIG. 4 is a first synchro-shift gear shifting table for a bicycle shift system having three front chainwheels and ten rear sprockets;

FIG. 5 is a second synchro-shift gear shifting table for a bicycle shift system having three front chainwheels and ten rear sprockets; and FIG. 6 is a third synchro-shift gear shifting table for a bicycle shift system having two front chainwheels and ten rear sprockets.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
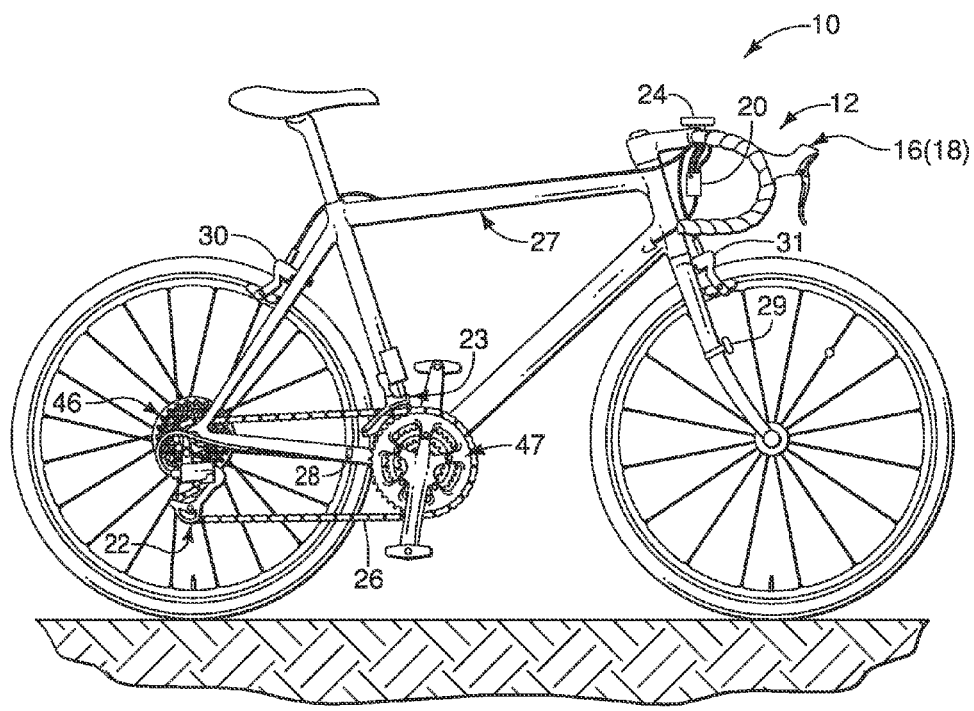
FIG. 1 is a side elevational view of a bicycle that is equipped with a bicycle gear changing apparatus in accordance with one embodiment.
Figure 2:
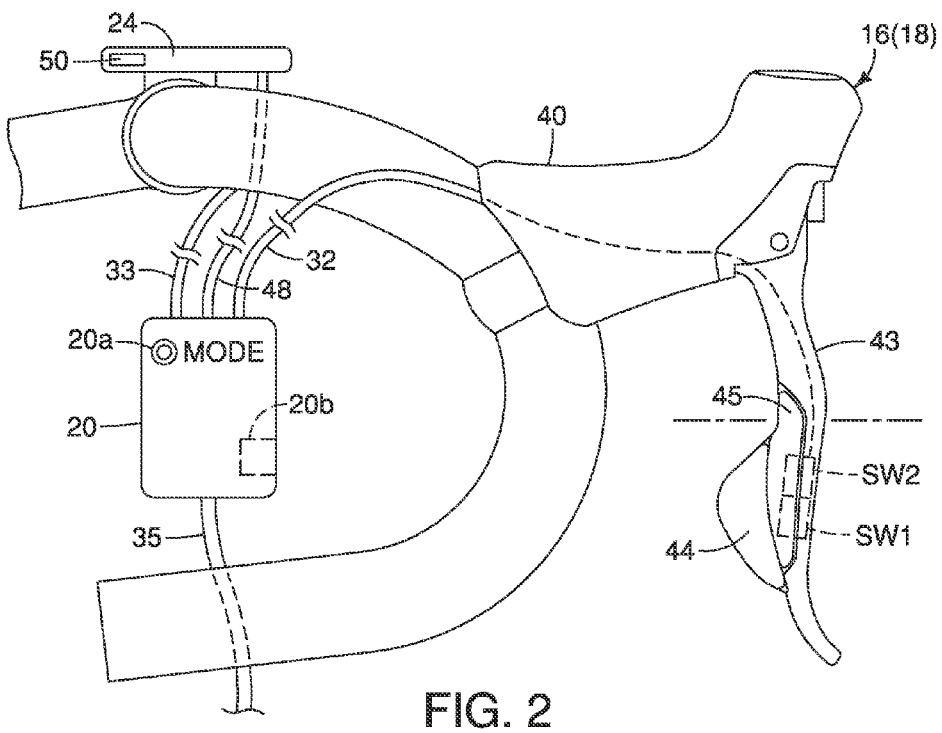
FIG. 2 is a side elevational view of the a handlebar area of the bicycle showing a road bicycle control (brake/shift) device and a cycling computer coupled to a drop type handlebar of the bicycle illustrated in FIG. 1.
Figure 3:
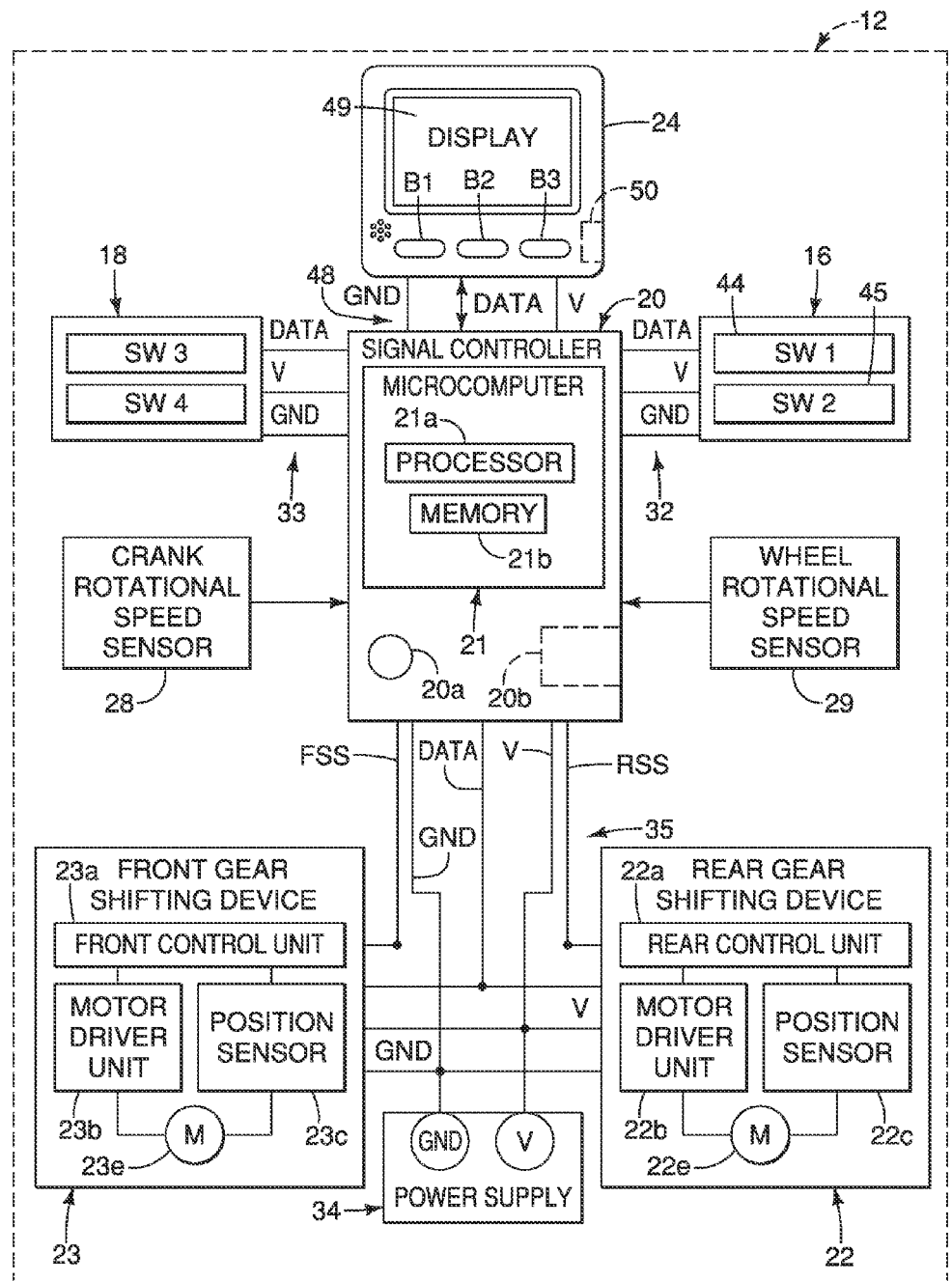
FIG. 3 is a schematic block diagram showing an overall configuration of an electric bicycle shift system including the bicycle gear changing apparatus in accordance with the embodiment illustrated in FIGS. 1 and 2.

Referring initially to FIG. 1, a bicycle 10 is illustrated that is equipped with a bicycle gear changing apparatus 12 in accordance with a first embodiment. While the bicycle 10 is illustrated as a road bike, the bicycle gear changing apparatus 12 is not limited to use with a road bike. For example, this invention can also be applied to mountain bikes or any type of bicycle. As seen in FIGS. 1 to 3, the bicycle gear changing apparatus 12 is a part of an electric bicycle shift system. The bicycle gear changing apparatus 12 includes a first shift operating device or shifter 16 and a second shift operating device or shifter 18. The first and second shift operating devices 16 and 18 are examples of an upshifting input and/or a downshifting input of the bicycle gear changing apparatus 12 as explained below. The bicycle gear changing apparatus 12 also includes a signal controller 20 for changing gears of the bicycle 10 in response to operation of the first shift operating device or shifter 16 and a second shift operating device or shifter 18. The signal controller 20 includes a microcomputer 21. The bicycle gear changing apparatus 12 further includes a first gear changing device 22, a second gear changing device 23 and a cycling computer 24. An electric (motorized) rear derailleur corresponds to a first gear changing device 22, while an electric (motorized) front derailleur that corresponds to the second gear changing device 23.

The microcomputer 21 having a processor 21$a$ and memory 21$b$ for processing the various signals from the various sensors and components of the bicycle gear changing apparatus 12. The signal controller 20 also includes a shift control program that controls the movement of the gear changing devices 22 and 23 as discussed below. The shift control program can be stored in the memory 21$b$, which includes a ROM (Read Only Memory) device and a RAM (Random Access Memory) device. While the signal controller 20 is electrically connected to the other parts of the bicycle gear changing apparatus 12 as schematically illustrated in FIG. 3, it will be apparent from this disclosure that wireless communication may be used to operatively couple the signal controller 20 to other parts of the bicycle gear changing apparatus 12 for receiving data. The signal controller 20 interprets and executes instructions (data, signals and commands) of the various programs and hardware to direct the operation of the bicycle gear changing apparatus 12. While the signal controller 20 is illustrated as a single separate unit, the signal controller 20 could be part of another component or could be a part of several components (e.g., multiple controllers located in different parts).

In the illustrated embodiment, the signal controller 20 is provided with a mode button 20$a$ for the rider or other users to select either the manual shifting mode, which includes both a synchro-shifting mode and a non-synchro-shifting mode, or the automatic shifting mode, which includes both a synchro-shifting mode and a non-synchro-shifting mode. Alternatively, the operating mode of the bicycle gear changing apparatus 12 can be selected in other ways such as by using the cycling computer 24 and/or operating buttons on one of the first and second shift operating devices 16 and 18. Preferably various parameters for the bicycle gear changing apparatus 12 can be changed from a default setting by the user to provide a customized the shifting routes. The various features of the bicycle gear changing apparatus 12 can also be customize by attaching a personal computer to the bicycle gear changing apparatus 12 via a communication port 20$b$.

Basically, in order to shift gears in the manual shifting mode, the first and second shift operating devices 16 and 18 are selected and operated by the rider to output control signals to the signal controller 20 which in turn outputs shift signals to operate the first and second gear changing devices 22 and 23 to move a chain 26 laterally with respect to a bicycle frame 27. In the automatic shifting mode, the signal controller 20 controls the first and second gear changing devices 22 and 23 based on one or more control signals from one or more running condition sensors.

Preferably, the signal controller 20 is configured to output control (shift) signals for performing a synchro-shift during both the manual shifting mode and the automatic shifting mode. Of course, the manual shifting mode and the automatic shifting mode can also be set without the synchro-shift feature. As used herein, the terms "synchro-shift" and "synchro-shifting" refer to a shift in which both the rear and front gear shifting devices (e.g., the first and second gear changing devices 22 and 23) are shifted nearly simultaneously to attain a target gear ratio in response to operation of a single shift operating member (e.g., first or second shift operating devices 16 or 18) or a predetermined running condition occurring.

The term "single shift operating member" as used herein referred to a shift operating member that includes an upshift switch and a downshift switch. However, the term "single shift operating member" as used herein is not limited to a single shifter unit as illustrated in FIGS. 1 and 2. For example, the electrical switches SW1 and SW2 of the first shift operating device 16 may be disposed such that the electrical switches SW1 and SW2 are apart from each other (e.g. the electrical switch SW1 can be disposed on the right of the handlebar, while the electrical switches SW2 is disposed on the left of the handlebar). Similarly, the electrical switches SW3 and SW4 of the second shift operating device 18 may be disposed such that the electrical switches SW3 and SW4 are apart from each other (e.g. the electrical switch SW3 can be disposed on the right of the handlebar, the electrical switch SW4 can be disposed on the left of the handlebar).

In manual synchro-shifting mode, only one of the first and second shift operating devices 16 and 18 can be used to perform the synchro-shift, and the other the first and second shift operating devices 16 and 18 can only be used to perform individually shifting similar to the manual non-synchro shift mode. Thus, the one of the first and second shift operating devices 16 and 18 that performs synchro-shifting is referred to as a synchro-shift operating device. On the other hand, the other one of the first and second shift operating devices 16 and 18 that performs non-synchro-shifting is referred to as a non-synchro-shift operating device.

In the manual non-synchro-shifting mode, the rider operates the first and second shift operating devices 16 and 18 to output control signals to the signal controller 20 which in turn outputs shift signals to individually operate either the first gear changing device 22 or the second gear changing device 23.

In the illustrated embodiment, as illustrated in FIG. 3, a crank rotational speed sensor 28 and a wheel rotational speed sensor 29 are provided for providing data to the signal controller 20 for automatically controlling the shifting of the derailleurs 22 and 23. For example, based on the detection signals from the crank rotational speed sensor 28 and the wheel rotational speed sensor 29, the signal controller 20 outputs control signals to shift the derailleurs 22 and 23 to attain a target gear ratio so that the cadence is maintained at approximately 60-70 RPM, which is a comfortable value for an ordinary person cruising on a bicycle. This type of automatic shifting as well as other types of automatic shifting can be performed by the signal controller 20. Since conventional automatic shifting can be used, the details of the automatic shifting mode will not be discussed in further detail herein.

As illustrated in FIGS. 1 and 2, the first and second shift operating devices 16 and 18 are brake and shift operating devices in which the first shift operating device 16 is fixedly mounted on the right-hand side of the handlebar and the second operating device 18 is fixedly mounted on the left-hand side of the handlebar. In particular, the first shift operating device 16 is operatively connected to the first gear changing device 22 and a rear brake 30, while the second shift operating device 18 is operatively connected to the second gear changing device 23 and a front brake 31. In the illustrated embodiment, the first and second shift operating devices 16 and 18 are mechanically connected to the rear and front brakes 30 and 31, respectively, using conventional Bowden-type brake cables. In the illustrated embodiment, the first and second shift operating devices 16 and 18 are electrically connected to the signal controller 20 by first and second electrical cables 32 and 33. Alternatively, the second gear changing device 23 and the front brake 31 can be connected to the first shift operating device 16, and the first gear changing device 22 and the rear brake 30 can be connected to the second operating device 18.

As illustrated in FIGS. 2 and 3, the first and second electrical cables 32 and 33 output shift signals or commands to the signal controller 20 for controlling the first and second gear changing devices 22 and 23, respectively. The first and second shift operating devices 16 and 18 also receive electrical power from a power supply or battery 34 (see FIG. 3). In particular, an electrical harness 35 is provided between the signal controller 20 and the power supply 34 such that electrical power is supplied to the signal controller 20, which in turn supplies electrical power to the first and second shift operating devices 16 and 18 via the first and second electrical cables 32 and 33, respectively. The electrical harness 35 transmits shift signals (FSS, RSS) and position signals for the shifting devices (DATA) between the signal controller 20 and the first and second gear changing devices 22 and 23. The cables 32 and 33 and the electrical harness 35 may be replaced by a cable which includes only two conductor cables. In this case, PLC (Power Line communication) circuit boards may be included in the signal controller 20 and the first and second gear changing devices 22 and 23.

As illustrated in FIG. 2, the first shift operating device 16 is attached the curved portion of the handlebar, which is a drop-down handlebar in the illustrated embodiment. The second operating device 18 is a mirror image of the first shift operating device 16 and includes all of the features of the first shift operating device 16 discussed herein. Thus, the second operating device 18 will not be discussed in detail herein. Of course, it will be apparent from this disclosure that other types of electric shifters can be used as needed and/or desired instead of the type illustrated herein.

Basically, the first shift operating device 16 includes a base member 40 fixedly mounted on the right-hand side of the handlebar in a conventional manner such as a band clamp as illustrated. A brake lever 43 is pivotally mounted to the base member 40 for operating the rear brake 30 in a conventional manner. The brake lever 43 has a pair of pivotally mounted shift operating members 44 and 45. The shift operating members 44 and 45 are pushed toward a center plane of the bicycle to depress electrical switches SW1 and SW2, respectively. A more detailed discussion of the shift operating members 44 and 45 and the electrical switches SW1 and SW2 can be found in U.S. Pat. No. 7,854,180 (assigned to Shimano Inc.). The shift operating members 44 and 45 are examples of upshifting inputs and/or downshifting inputs of the bicycle gear changing apparatus 12. The second shift operating device 18 is a mirror image of the first shift operating device 16, and thus, has a pair of pivotally mounted shift operating members that operates the switches SW3 and SW4.

While the shift operating members 44 and 45 and the electrical switches SW1 and SW2 of the illustrated embodiment are constructed as shown in U.S. Pat. No. 7,854,180, the first and second shift operating devices 16 and 18 are not limited to that particular construction. In fact, the first and second shift operating devices 16 and 18 can be replaced with mechanical shifters such as disclosed in U.S. Pat. No. 5,970,816, which has a manual synchro-shift system.

As mentioned above, the controller 20 is configured to set at least a synchro-shifting mode and a non-synchro-shifting mode. Hereinafter, operation of the electrical switch SW1 outputs first signals when operated, the electrical switch SW2 outputs second signals when operated, the electrical switch SW3 outputs third signals when operated and the electrical switch SW4 outputs fourth signals when operated. While the controller 20 is set to the non-synchro-shifting mode, the controller 20 only controls one of the first and second gear changing devices 22 and 23 in response to receiving the first signals and the third signals and only controls the other of the first and second gear changing devices 22 and 23 in response to receiving the second signals and the fourth signals. Thus, non-synchro-shifting mode, in operation of the shift operating member 44 normally causes the first gear changing device 22 to perform a downshift operation such that the chain 26 moves to a larger one of the rear sprockets 46, while operation of the shift operating member 45 normally causes the first gear changing device 22 to perform an upshift operation such that the chain 26 moves to a smaller one of the rear sprockets 46. The second shift operating device 18, in non-synchro-shifting mode, operates the second gear changing device 23 in a similar manner. However, the controller 20 is configured to set a synchro-shifting mode in which the controller 20 operates both the first and second gear changing devices 22 and 23 at a synchro-shift point in accordance with the first prescribed shift route in response to receiving the first shift signals. However, in the synchro-shifting mode, operation of the shift operating member 44 may cause the first gear changing device 22 to perform a downshift operation, while operation of the shift operating member 45 may cause the first gear changing device 22 to perform an upshift operation.

Referring to FIG. 3, the basic construction of the first gear changing device 22 will now be discussed. The first gear changing device 22 is basically a conventional electric derailleur that includes a rear control unit 22a (controller), a motor drive unit 22b, a position sensor 22c and a motor 22e. The rear control unit 22a, the motor drive unit 22b and the position sensor 22c form the rear actuating unit. The rear control unit 22a is configured and arranged to control the motor drive unit 22b in response to a shift control signal from operation of one of the shift switches SW1 and SW2 of the first shift operating device 16. The motor 22e is configured and arranged to drive a chain cage of the first gear changing device 22. The motor drive unit 22b is configured and arranged to drive the motor 22e. The position sensor 22c is configured and arranged to sense the gearshift position of the rear gear shifting device 22. The position sensor 22c constitutes one example of a transmission state determining component of the bicycle gear changing apparatus 12. One example of an electric rear derailleur having a position sensor (i.e., a transmission state determining component) is disclosed in U.S. Pat. No. 8,137,223 (assigned to Shimano Inc.). While a potentiometer can be used for the position sensor 22c such as disclosed in U.S. Pat. No. 8,137,223, the position sensor 22c is not limited to such a construction.

Referring back to FIG. 1, the bicycle 10 has a plurality of rear sprockets 46 for selectively receiving a drive force from the chain 26. Operation of the motor 22e of the first gear changing device 22 moves the chain 26 between the rear sprockets 46 to change rear gear stages. While the bicycle 10 is illustrated with only nine of the rear sprockets 46, the bicycle 10 can be provided with fewer or more rear sprockets 46.

Referring back to FIG. 3, the basic construction of the second gear changing device 23 will now be discussed. The second gear changing device 23 is basically a conventional electric derailleur that includes a front control unit 23a (controller), a motor drive unit 23b, a position sensor 23c and a motor 23e. The front control unit 23a, the motor drive unit 23b and the position sensor 23c form the front actuating unit. The front control unit 23a is configured and arranged to control the motor drive unit 23b in response to a shift control signal from operation of one of the shift switches SW3 and SW4 of the second shift operating device 18. The motor 23e is configured and arranged to drive a chain cage of the second gear changing device 23. The motor drive unit 23b is configured and arranged to drive the motor 23e. The position sensor 23c is configured and arranged to sense the gearshift position of the front gear shifting device 23. The position sensor 23c constitutes one example of a transmission state determining component of the bicycle gear changing apparatus 12. One example of an electric front derailleur having a position sensor (i.e., a transmission state determining component) is disclosed in U.S. Pat. No. 7,306,531 (assigned to Shimano Inc.). While a potentiometer can be used for the position sensor 23c such as disclosed in U.S. Pat. No. 7,306,531, the position sensor 23c is not limited to such a construction.

Referring back to FIG. 1, the bicycle 10 has a plurality front chainwheels 47 for transmitting a pedaling (drive) force to the chain 26. Operation of the motor 23e of the second gear changing device 23 moves the chain 26 between the front chainwheels 47 to change front gear stages. While the bicycle 10 is illustrated with only three of the front chainwheels 47, the bicycle 10 can be provided with two front chainwheels or more than three front chainwheels.

The cycling computer 24 includes a microprocessor, memory and other conventional structures of a conventional cycling computer. Since cycling computers are conventional devices that are well known, the cycling computer 24 will not be discussed and/or illustrated herein, except as modified to accommodate the bicycle gear changing apparatus 12. In particular, the cycling computer 24 is electrically connected to the signal controller 20 by a cable 48 to receive various data from other components of the bicycle gear changing apparatus 12. The cable 48, can also optionally supply power to the cycling computer 24 as illustrated in FIG. 3. Alternatively, the cycling computer 24 can have its own power supply (e.g., a replaceable battery).

As illustrated in FIGS. 1 to 3, the cycling computer 24 is a part of the bicycle gear changing apparatus 12. However, the various functions of the cycling computer 24 can be integrated into one or both of the first and second shift operating devices 16 and 18 and/or the signal controller 20.

The cycling computer 24 has a display 49 for displaying gear positions, speed, traveled distance and other information to the rider as in the case of most cycling computers. Also in the illustrated embodiment, the cycling computer 24 further includes an input port 50 that is a communication port such as a USB port for attaching a computer to update software and/or modify various operating parameters of the bicycle gear changing apparatus 12.

In the illustrated embodiment of FIG. 4, the gear shift mechanism (e.g., the first and second gear changing devices 22 and 23) of the bicycle has a plurality of speed stages (e.g. thirty speed stages without the synchro-shift feature and twenty one speed stages with the synchro-shift feature). A high gear ratio refers to a higher bicycle speed per rotation of the crank arms, while a low gear ratio refers to a lower bicycle speed per rotation of the crank arms. In the synchro-shift operations illustrated in FIG. 4, a single gear shift operation occurs between the front chainwheels 47 and a double gear shift operation occurs in the rear sprockets 46.

The bicycle transmission of FIG. 1 has a total of thirty speed stages while the synchro-shift feature is not in use. However, while the synchro-shift feature is in use, the bicycle transmission of FIG. 1 has a total of only twenty-one speed stages as illustrated in FIG. 4. In the example of FIG. 4, the bicycle transmission of FIG. 1 includes at least one synchro-shift point, which includes the fifth speed stage (i.e., counting from the lowest gear ratio to the highest gear ratio along the synchro-upshifting route). However, the bicycle transmission is not limited to a single synchro-shift point bicycle transmission. The locations and numbers of synchro-shift points will depend on the particular gear ratios that can be attained in the particular bicycle transmission. In other words, the tooth count can be changed for the rear sprockets and the front chainwheels to change the gear ratios, which can be attained such that more or less rear sprockets and/or front chainwheels can be changed for increasing or decreasing the attainable number of speed stages.

For example, FIG. 4 illustrates a shift table for a bicycle transmission with ten rear sprockets, three front chainwheels, and a synchro-shift occurring at the shift between the fifth and the sixth speed stages. In this case, when the rider operates only the upshift switch of the synchro-shift operating device, a synchro-shift route is followed to increase gear ratio in order from the first gear stage having a gear ratio of 0.67 (CS: thirty-six teeth and FC: twenty-four teeth). In this case the gear ratios are changed with the upshift switch of the synchro-shift operating device as follow: 0.67 (CS: 1st stage and FC: Low stage)→0.75 (CS: 2nd stage and FC: Low stage)→0.86 (CS: 3rd stage and FC: Low stage)→1.00 (CS: 4th stage and FC: Low stage)→1.14 (CS: 5th stage and FC: Low stage)→1.33 (CS: 4th stage and FC: Mid stage)→1.52 (CS: 5th stage and FC: Mid stage)→1.68 (CS: 6th stage and FC: Mid stage)→1.88 (CS: 7th stage and FC: Mid stage)→2.21 (CS: 6th stage and FC: Top stage)→2.47 (CS: 7th stage and FC: Top stage)→2.80 (CS: 8th stage and FC: Top stage)→3.23 (CS: 9th stage and FC: Top stage)→3.82 (CS: 10th stage and FC: Top stage). When the rider operates only downshift switch of the synchro-shift operating device, a synchro-shift route is followed to decrease the gear ratio in order from last gear stage (CS: eleven teeth and FC: forty-two teeth). In this case the gear ratios are changed with the downshift switch of the synchro-shift operating device as follow: 3.82 (CS: 10th stage and FC: Top stage)→3.23 (CS: 9th stage and FC: Top stage)→2.80 (CS: 8th stage and FC: Top stage)→2.47 (CS: 7th stage and FC: Top stage)→2.21 (CS: 6th stage and FC: Top stage)→2.00 (CS: 5th stage and FC: Top stage)→1.75 (CS: 4th stage and FC: Top stage)→1.50 (CS: 3rd stage and FC: Top stage)→1.31 (CS: 2nd stage and FC: Top stage)→1.14 (CS: 3rd stage and FC: Mid stage)→1.00 (CS: 2nd stage and FC: Mid stage)→0.89 (CS: 1st stage and FC: Mid stage)→0.75 (CS: 2nd stage and FC: Low stage)→0.67 (CS: 1st stage and FC: Low stage).

Even while in the manual synchro-shifting mode, the non-synchro-shift operating device can be operated to perform an individual shift in the same way as in the manual non-synchro shift mode. For example, in accordance with the shift table of FIG. 4, when the present shift stage corresponds to the 3rd stage of the rear stages (CS) and the Low stage of the front stages (FC) and the rider operates the upshift switch of the non-synchro-shift operating device, then the front stage (FC) is changed from the Low stage to the Mid stage with the 3rd stage of the present rear stage (CS) remaining engaged. At this point (CS: 3rd stage and FC: Mid stage), when the rider operates the upshift switch of the synchro-shift operating device, the rear stage (CS) is changed from the 3rd stage of the rear stages (CS) to the 4th stage of the rear stages (CS) with the Mid stage of the present front chainwheel (FC) remaining engaged.

FIGS. 4, 5 and 6 are examples of prestored shift tables for use while in the synchro-shifting mode. The prestored shift tables are stored in the memory 21b such that the controller 20 operates the first gear changing device 22 and the second gear changing device 23 in response to signals from the electrical switches SW1, SW2, SW3 and SW4. In particular, the controller 20 is configured to be operatively coupled to a first input, such as one of the electrical switches SW1, SW2, SW3 and SW4 (e.g., the electrical switch SW1), to receive first shift signals. The controller 20 outputs control signals to control at least one of the first gear changing device 22 and the second gear changing device 23 in accordance with a first prescribed shift route of one of the prestored shift tables in response to receiving the first shift signals. The controller 20 is configured to be operatively coupled to a second input, such as one of the electrical switches SW1, SW2, SW3 and SW4 (e.g., the electrical switch SW2), to receive second shift signals. Also the controller 20 outputs control signals to control at least one of the first and second gear changing devices 22 and 23 in accordance with a second prescribed shift route of one of the prestored shift tables, wherein the second prescribed shift route is different from the first prescribed shift route in response to receiving the second shift signals. In other words, the controller 20 outputs control signals to selectively control the first and second gear changing devices 22 and 23 in response to receiving the second shift signals. Of course, it will be apparent from this disclosure that additional prestored shift tables can be stored in the memory 21b for operating the first and second gear changing devices 22 and 23 in response to signals from the electrical switches SW1, SW2, SW3 and SW4.

Preferably, the controller 20 is further configured to be operatively coupled to a third input, such as one of the electrical switches SW, SW2, SW3 and SW4 (e.g., the electrical switch SW3) to receive third shift signals. The controller 20 outputs control signals to control at least one of the first and second gear changing devices 22 and 23 in accordance with a third prescribed shift route in response to receiving the third shift signals.

Preferably, the controller 20 is further configured to be operatively coupled to a fourth input, such as one of the electrical switches SW1, SW2, SW3 and SW4 (e.g., the electrical switch SW4) to receive fourth shift signals. The controller 20 outputs control signals to control the at least one of the first and second gear changing devices 22 and 23 in accordance with a fourth prescribed shift route that is different from the third prescribed shift route in response to receiving the fourth shift signals.

In the synchro-shifting mode, the controller 20 can be set by the user to use the switches SW1 and SW2 of the first shift operating device 16 to operate the first and second gear changing devices 22 and 23 in accordance with the synchro-shifting routes that are prestored in the shifting table, and to use the switches SW3 and SW4 of the second shift operating device 18 to operate one of the first and second gear changing devices 22 and 23 in the non-synchro-shifting routes. In other words, with the first shift operating device 16, one of the switches SW1 and SW2 performs upshifting along the synchro-upshift route and the other of the switches SW1 and SW2 performs downshifting along the synchro-downshift route. With the second shift operating device 18, one of the switches SW3 and SW4 performs upshifting of only one of the first and second gear changing devices 22 and 23, and the other of the switches SW3 and SW4 performs downshifting of the same one of the first and second gear changing devices 22 and 23.

Alternatively, in the synchro-shifting mode, the controller 20 can be set by the user to use one of the switches SW1 and SW2 of the first shift operating device 16 to perform either upshifting or downshifting along the corresponding synchro-shift route and to use one of the switches SW3 and SW4 of the second shift operating device 18 to perform the other of either upshifting or downshifting along the corresponding synchro-shift route. The remaining two of the switches SW1, SW2, SW3 and SW4 are used to operate one of the one of the first and second gear changing devices 22 and 23 in the non-synchro-shifting routes.

The controller 20 is configured to set a synchro-shifting mode in which the controller 20 operates both the first and second gear changing devices 22 and 23 at a synchro-shift point in accordance with the first prescribed shift route in response to receiving the first shift signals.

Referring to FIG. 4, this prestored shift table has prescribed shift routes indicated by the broken arrows with synchro-shift points being circled. The synchro-shift point is determined by a pair of gear ratios or a pair of the front shift stages and rear shift stages which occurs before and after the shift. In this embodiment, the synchro-points include a plurality of synchro-upshift shift points and a plurality of synchro-downshift points. The synchro-shift point is determined by a pair of gear ratios or a pair of the front shift stages and the rear shift stages which occurs before and after the shift. In this embodiment, the synchro-shift point includes a synchro-upshift point and a synchro-downshift point. In FIG. 4, the synchro-upshift points includes a pair of gear ratios 1.14 (i.e., where the pair is the front shift stage is the Low stage and the rear shift stage is the 5th stage) and 1.33 (i.e., where the pair is the front shift stage is the Mid stage and the rear shift stage is the 4th stage), and a pair of gear ratios 1.88 (i.e., where the pair is the front shift stage is the Mid stage and the rear shift stage is the 7th stage) and 2.21 (i.e., where the pair is the front shift stage is the Top stage and the rear shift stage is the 6th stage). In FIG. 4, the synchro-downshift points includes a pair of gear ratios 1.31 (i.e., where the pair is the front shift stage is the Top stage and the rear shift stage is the 2nd stage) and 1.14 (i.e., where the pair is the front shift stage is the Mid stage and the rear shift stage is the 3rd stage), and a pair of gear ratios 0.89 (i.e., where the pair is the front shift stage is the Mid stage and the rear shift stage is the 1st stage) and 0.75 (i.e., where the pair is the front shift stage is the Low stage and the rear shift stage is the 2nd stage).

The prescribed shift routes of the prestored shift table of FIG. 4 are used while the controller 20 is in a synchro-shifting mode. While the bicycle gear changing apparatus 12 is in the synchro-shifting mode, the gear ratios, which are shaded with diagonal lines in FIG. 4, are not available. However, while in the non-synchro-shifting mode, the rider can shift the first and second gear changing devices 22 and 23 to attain any of the gear ratios in the shift table of FIG. 4. The non-synchro-shifting is indicated by the wider arrows. As seen in FIG. 4, the synchro-downshift route has a synchro-downshift point that is different from a synchro-upshift point for shifting between the front chainwheels 47. Thus, the controller 20 sets a synchro-downshift point of one of the first and third prescribed shift routes and a synchro-upshift point of the other of the first and third prescribed shift routes to provide two distinct synchro-shift routes. In other the embodiment, while the bicycle gear changing apparatus 12 is in the synchro-shifting mode, the gear ratios, which are shaded with diagonal lines in FIG. 4, may be available. For example when the present shift stage is the 9th stage of the rear stages (CS) and the Top stage of the front stages (FC) and then the rider operates the downshift switch of the other of the first and second shift operating devices 16 and 18 (i.e., the one acting as a non-synchro-shift operating device), the front stage (FC) can be changed from the Top stage to the Mid stage. At this point, both the first shift operating device 16 and the second shift operating device 18 can make an individual shift as in the manual non-synchro shift mode. When the gear ratio come back to one of the gear ratios within the synchro-shift route, the controller 20 then controls the shift along the synchro-shift route based on the one of the first and second shift operating devices 16 and 18 (i.e., the one acting as a synchro-shift operating device).

Thus, the shift table of FIG. 4 defines a plurality of distinct synchro-shift routes between two adjacent ones of the front chainwheels 47. The synchro-downshift point and the synchro-upshift point (e.g., the gear changing points of a synchro-shift) can be set by user by using the cycle computer 24 or an external computer. The controller 20 outputs the control signals to control a gear ratio established by the first gear changing device 22 and the second gear changing device 23 such that the gear ratio changes in an ascending order during an upshift operation and changes in a descending order during a downshift operation.

Referring to FIG. 5, with this prestored shift table, when the front gear changed (i.e., the chain 26 shifted from one of the front chainwheels 47 to the next one), the rear gear is not changed (i.e., the chain 26 not shifted from the current one of the rear sprockets 46 to the next one) in a synchro-shift route. However, while the bicycle gear changing apparatus 12 is in the synchro-shifting mode, the gear ratios, which are shaded with diagonal lines in FIG. 5, are not available. Here, the controller 20 outputs control signals to control only the front derailleur (e.g., the second gear changing device 23) in response to receiving the second shift signals from the second shift operating device 18.

As seen in FIG. 6, the controller 20 sets a synchro-downshift point of one of the first and third prescribed shift routes and a synchro-upshift point of the other of the first and third prescribed shift routes to provide a single synchro-shift route. Also with this prestored shift table, in the synchro-shifting mode, if a first shift signal is inputted after the gear is shifted by the second shift signal from a gear ratio within the prescribed shift route to a gear ratio not included within the prescribed shift route (from 1.58 to 1.00), then the controller 20 control at least one of the first and second gear changing devices 22 and 23 to approach the prescribed shift route. For example, while in the synchro-shifting mode with the present gear ratio being 1.00 (not within the synchro-shift route), when a first (up) shift signal is inputted, the controller 20 operates the first and second gear changing devices 22 and 23 to change the gear ratio from the present gear ratio to a higher gear ratio that is the closest gear ratio in the synchro-shift route (e.g. 1.19). Also for example, while in the synchro-shifting mode with the present gear ratio being 1.00 (not within the synchro-shift route), when a first (down) shift signal is inputted, the controller 20 moves the first gear changing device 22 to change the gear ratio from the present gear ratio to the next lower gear ratio (e.g. 0.86). In this embodiment, in the synchro-shifting mode, when the present gear is out of the synchro-shift route, it is easy to come back the synchro-shift route.

While the gear changing apparatus 12 of the above described embodiment is configured such that the synchro-shifting mode and the non-synchro-shifting mode can be selected by a user as needed and/or desired, the present invention is not limited to this configuration. For example, the gear changing apparatus 12 can have only a synchro-shifting mode.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, the term "upshift" refers to a change in a gear ratio of a transmission that results in the bicycle wheels rotating faster per rotation of the crank arms. As used herein, the term "downshift" refers to a change in a gear ratio of a transmission that results in the bicycle wheels rotating slower per rotation of the crank arms.

While only selected embodiments have been chosen to illustrate the present invention, it will be apparent to those skilled in the bicycle field from this disclosure that various changes and modifications can be made herein without departing from the scope of the invention as defined in the appended claims. For example, the size, shape, location or orientation of the various components can be changed as needed and/or desired so long as they do not substantially affect their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle gear changing apparatus comprising:
a controller including memory with a plurality of pre-stored shift tables, at least one of the pre-stored shift tables comprises a first prescribed synchro-shift route and a second prescribed synchro-shift route that is different from the first prescribed synchro-shift route, each of the first and second prescribed synchro-shift routes having at least one synchro-shift point;
the controller being configured to control a shifting operation of at least one of a first gear changing device and a second gear changing device based on a selected one of the pre-stored shift tables.

2. The bicycle gear changing apparatus according to claim 1, further comprising
a cycle computer operatively coupled to the controller to select which one of the pre-stored shift tables is used in controlling the first and second gear changing devices.

3. The bicycle gear changing apparatus according to claim 2, wherein
the cycle computer includes an input port configured to be attached to a computer to select the pre-stored shift tables.

4. The bicycle gear changing apparatus according to claim 1, further comprising
a first shift operating device including a first electrical switch and a second electrical switch, the controller being configured to actuate at least one of the first and second gear changing devices in accordance with the first prescribed synchro-shift route upon receiving a first shift signal generated by the first electrical switch of the first shift operating device, and
the controller being further configured to actuate at least one of the first and second gear changing devices in accordance with the second prescribed synchro-shift route upon receiving a second shift signal generated by the second electrical switch of the first shift operating device.

5. The bicycle gear changing apparatus according to claim 4, wherein
the controller is configured to operate both the first and second gear changing devices at a synchro-shift point of the at least one synchro-shift point of the first and second prescribed synchro-shift routes in response to receiving one of the first and second shift signals generated by a corresponding one of the first and second electrical switches of the first shift operating device.

6. The bicycle gear changing apparatus according to claim 4, further comprising
a second shift operating device including a third electrical switch and a fourth electrical switch,
at least one of the pre-stored shift tables comprises a third prescribed synchro-shift route and a fourth prescribed synchro-shift route,
the controller being configured to actuate at least one of the first and second gear changing devices in accordance with the third prescribed synchro-shift route upon receiving a third shift signal generated by the third electrical switch,
the controller being further configured to actuate at least one of the first and second gear changing devices in accordance with the fourth prescribed synchro-shift route upon receiving a fourth shift signal generated by the fourth electrical switch.

7. The bicycle gear changing apparatus according to claim 6, wherein
the controller is configured to operate the first gear changing device and the second gear changing device in accordance with the first prescribed synchro-shift route in response to receiving the first shift signal from the first electrical switch,
the controller is configured to operate the first gear changing device and the second gear changing device in accordance with the second prescribed synchro-shift route in response to receiving the second shift signal from the second electrical switch,
the controller is configured to operate the first gear changing device and the second gear changing device in accordance with the third prescribed synchro-shift route in response to receiving the third shift signal from the third electrical switch, and
the controller is configured to operate the first gear changing device and the second gear changing device in accordance with the fourth prescribed synchro-shift route in response to receiving the fourth shift signal from the fourth electrical switch.

8. The bicycle gear changing apparatus according to claim 6, wherein
the controller is configured to operate both the first and second gear changing devices at a synchro-shift point of at least one of the third and fourth prescribed synchro-shift routes in response to receiving one of the third and fourth shift signals generated by a corresponding one of the third and fourth electrical switches of the second shift operating device.

* * * * *